(12) United States Patent
Bradley et al.

(10) Patent No.: US 11,689,782 B2
(45) Date of Patent: *Jun. 27, 2023

(54) CONTENT DISTRIBUTION PIPELINE WATERMARKING

(71) Applicant: AT&T Intellectual Property I, L.P., Atlanta, GA (US)

(72) Inventors: Nigel Bradley, McDonough, GA (US); Timothy Innes, Atlanta, GA (US); James Pratt, Round Rock, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/493,784

(22) Filed: Oct. 4, 2021

(65) Prior Publication Data

US 2022/0030328 A1   Jan. 27, 2022

Related U.S. Application Data

(63) Continuation of application No. 15/991,431, filed on May 29, 2018, now Pat. No. 11,140,460.

(51) Int. Cl.
| | |
|---|---|
| *H04N 21/8358* | (2011.01) |
| *G06F 21/16* | (2013.01) |
| *H04L 9/32* | (2006.01) |
| *H04L 9/06* | (2006.01) |
| *G06F 16/18* | (2019.01) |

(52) U.S. Cl.
CPC ..... *H04N 21/8358* (2013.01); *G06F 16/1805* (2019.01); *G06F 21/16* (2013.01); *H04L 9/0637* (2013.01); *H04L 9/32* (2013.01); *H04L 2209/608* (2013.01)

(58) Field of Classification Search
CPC .......... H04N 21/8358; H04N 21/2541; H04N 21/2543; H04N 21/25875; H04N 21/44204; H04N 21/64715; G06F 16/1805; G06F 21/16; G06F 16/18; H04L 9/0637; H04L 9/32; H04L 2209/608; H04L 9/3239; H04L 9/50
See application file for complete search history.

(56) References Cited

U.S. PATENT DOCUMENTS

| | | |
|---|---|---|
| 7,318,236 B2 | 1/2008 | DeMello et al. |
| 7,802,306 B1 * | 9/2010 | Adams ............... G11B 20/0021 726/28 |
| 8,954,743 B2 | 2/2015 | Musser, Jr. |
| 9,106,964 B2 | 8/2015 | Zhao |
| 9,135,673 B2 | 9/2015 | Chalamala et al. |

(Continued)

*Primary Examiner* — Quazi Farooqui

(57) ABSTRACT

Methods, computer-readable media, and devices for tracking an accessing of a media content via a watermark embedded by a network node are disclosed. For example, a processing system including at least one processor may receive, from a first network node, a first copy of a watermark that is embedded by the first network node in a media content. The processing system may further receive a notification comprising a second copy of the watermark and an identification of a first endpoint device, the notification associated with an accessing of the media content by the first endpoint device, and record the accessing of the media content by the first endpoint device.

20 Claims, 3 Drawing Sheets

(56) References Cited

U.S. PATENT DOCUMENTS

| | | |
|---|---|---|
| 9,246,972 B2 | 1/2016 | Marr et al. |
| 9,491,147 B2 | 11/2016 | Kim et al. |
| 9,571,606 B2 | 2/2017 | Winograd |
| 9,591,382 B2 | 3/2017 | McMillan |
| 9,607,131 B2 | 3/2017 | Winograd et al. |
| 9,742,783 B2 | 8/2017 | Kim et al. |
| 9,756,289 B2 | 9/2017 | Bickmore et al. |
| 2003/0115454 A1* | 6/2003 | Piikivi .................. G06Q 30/02 705/77 |
| 2006/0100895 A1 | 5/2006 | Krusche |
| 2014/0229395 A1 | 8/2014 | Singer et al. |
| 2014/0325550 A1 | 10/2014 | Winograd et al. |
| 2016/0269765 A1 | 9/2016 | Mandyam |
| 2016/0292395 A1* | 10/2016 | Pintaux ............ H04N 21/25891 |
| 2017/0180822 A1 | 6/2017 | Pradel et al. |
| 2018/0121635 A1 | 5/2018 | Tormasov et al. |

\* cited by examiner

CONTENT DISTRIBUTION PIPELINE WATERMARKING

This application is a continuation of U.S. patent application Ser. No. 15/991,431, filed on May 29, 2018, now U.S. Pat. No. 11,140,460, which is herein incorporated by reference in its entirety.

The present disclosure relates generally to network-based media content access, and more particularly to devices, non-transitory computer-readable media, and methods for tracking an accessing of a media content via a watermark embedded by a network node.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
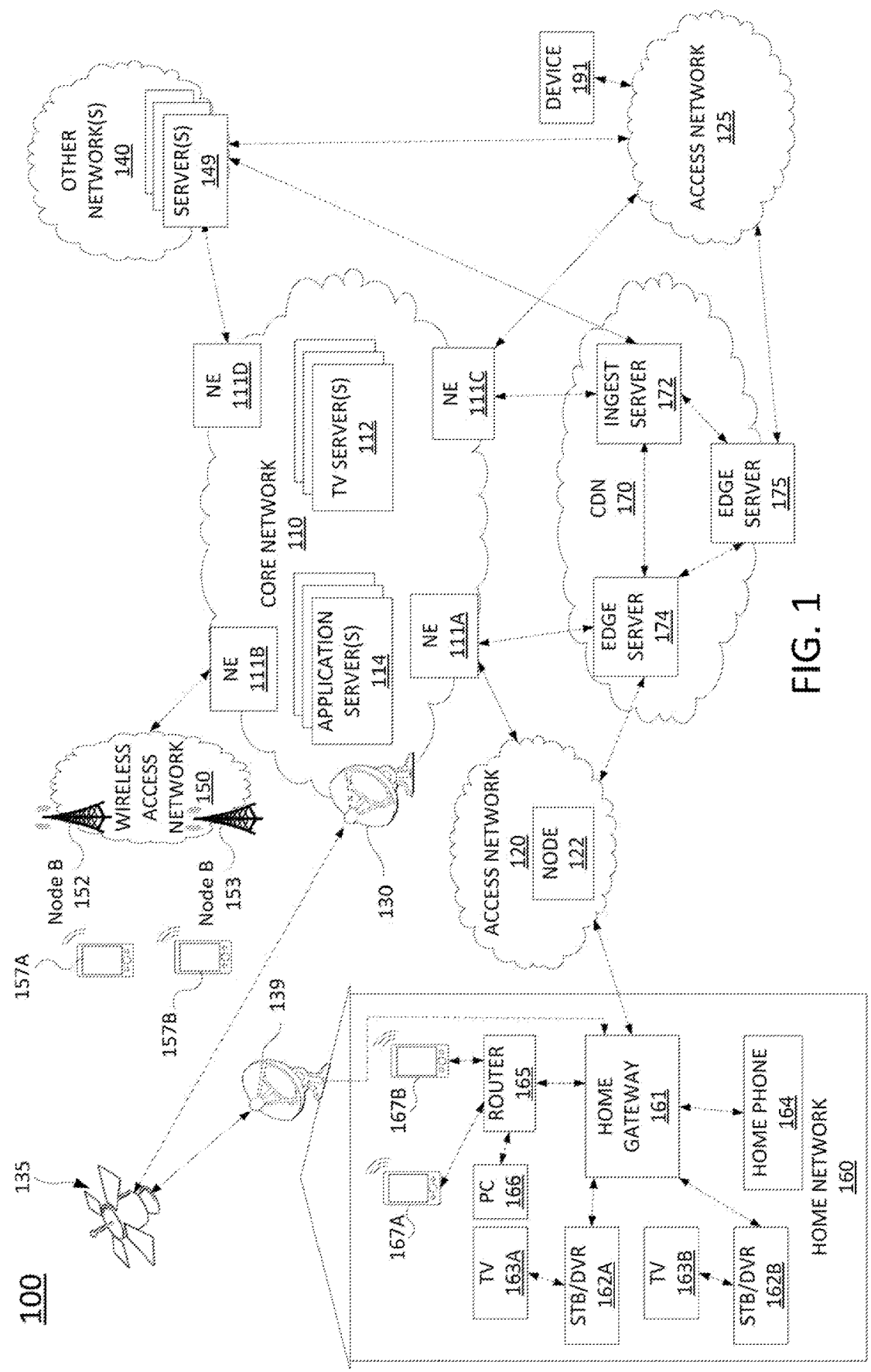
FIG. 1 illustrates an example network related to the present disclosure.

In one example, the present disclosure describes a method, computer-readable medium, and device for tracking an accessing of a media content via a watermark embedded by a network node. For instance, in one example, a processing system including at least one processor may receive, from a first network node, a first copy of a watermark that is embedded by the first network node in a media content. The processing system may further receive a notification comprising a second copy of the watermark and an identification of a first endpoint device, the notification associated with an accessing of the media content by the first endpoint device, and record an accessing of the media content by the first endpoint device.

In particular, examples of the present disclosure provide a system for real-time watermarking for media contents at nodes in a network distribution chain and at endpoint devices for both content access management and content consumption analytics. For example, a network-based controller (e.g., a content management server) may log device information of an originating order associated with a watermark and embed the watermark in the media content. In one example, a last-hop device in a telecommunication network may inspect the media content passing through the device to detect the watermark and report to the network-based controller. It may then be identified when a new device is accessing that same watermarked content and billed accordingly or logged for piracy tracking. For example, a detected usage of the watermarked media content may be billed by the network-based controller to the viewing device, regardless of the original source of the media content and/or an originally intended recipient device. In another example, the watermark may be inspected and the media content blocked from being forwarded to the destination device if the destination device is not authorized to receive the media content. In one example, the system may comprise a content distribution network (CDN) that is trusted with all content uploaded to one repository. The content may be watermarked and the actual usage tracked and billed accordingly.

In one example, multiple devices in a network distribution path may separately watermark the same media content so that when the content is viewed and the consumption of the content is reported to the system (e.g., the reporting of the watermarks associated with the content), the network-based controller may be made aware of which copy of a media content an endpoint device has received. For instance, a watermark can be added at strategic nodes, or a watermark can be modified at strategic nodes to create a trail or path through the network. In addition, watermarks may be read and reported by an endpoint device and/or a last-hop network-based device, e.g., a CDN edge router, to the network-based controller to track when and where the media content is accessed.

In accordance with the present disclosure, watermarks may be added to media content (e.g., audio and/or video) in a non-detectable manner, e.g., non-visible or non-audible way. In one example, the watermarks may comprise a machine-readable code (e.g., a predefined symbol, image or sound) embedded in the audio and/or video encoding. In one example, the watermark may identify a source of the media content and/or one or more devices in a distribution chain of the media content, e.g., where the media content came from, where the media content is going, when it was transferred, an intended recipient device, a permitted account, a permitted number of replays, a duration of rental, a geographic restriction, and so forth. For example only, some predictive video compression methods may involve the use of reference frames such as Intra-coded frames (I-frames) or Predicted frames (P-frames). The images of frames located before and after these reference frames can be derived based upon predicted data indicating changes or differences relative to these reference frames. In one example, the watermarks of the present disclosure can be included in one or more of these reference frames. In one example, watermarking may involve 1 out of every 100 I-frames, 1 out of every 200 I-frames, and so on. For audio content, encoders may embed watermarks by rearranging several bits of the audio data in a detectable predefined pattern. Although this type of watermarking may not be lossless, its impact can be made relatively small so that they are not generally noticeable to listeners of the audio. In addition, if it is not important to be able to recover the original audio contents, watermarking can also be encoded in delivery stream patterns. For instance, packet burst size and/or timing patterns of a delivery of the media content may comprise a code than can be a watermark.

In one example, a watermark may be stored as a blockchain transaction in a blockchain record. In particular, when a network-based device watermarks a given media content, the network-based device may submit a record of the transaction (the watermarking, and the contents of the watermark) to a blockchain network for recordation and later use in tracking consumption. In one example, the present disclosure may include a centralized network-based controller that maintains a blockchain ledger for tracking and verifying distribution and consumption of various media contents. In one example, network-based devices that are involved in watermarking media content may also maintain blockchain ledgers for tracking and verifying distribution and consumption. Alternatively, or in addition, other devices (e.g., mining devices) may be involved in the creation of blockchain records for transactions that are submitted by other devices.

For instance, dedicated mining devices may create blockchain records and submit completed records to other devices in the blockchain network, but may not be engaged in the watermarking and distribution of media content. In one example, the blockchain ledgers may be associated with a global public blockchain network. In another example, the blockchain network may be a private blockchain network maintained by a particular network service provider and/or the network service provider and one or more trusted partners (such as content creators, owners, distributors, licensors, etc.).

In one example, the system may comprise a CDN that does not utilize encryption across networks so that packets can be viewed as video, audio, and/or images and watermarks can be detected at CDN nodes. Alternatively, in one example, a CDN node (e.g., a CDN edge server) may authenticate on behalf of an endpoint device to decrypt packets and check for watermarks in media content. For example, a network of the present disclosure may be trusted so that protected content no longer needs to be encrypted across the network. Rather, the network watermarks content, tracks usage, and charges for the usage/consumption of the content appropriately on behalf of the content creators and/or content owners. In another example, a content source may provide media content for transport across the network in an encrypted format. In such an example, the network may be given trusted access into the encryption protocol, or partial access, e.g., ability to only decrypt a portion of the content containing the watermark, e.g., a particular location of an image, e.g., an upper left corner of the image, an upper right corner of the image, a lower left corner of the image, a lower right corner of the image, and so on.

Examples of the present disclosure may provide a decrease in piracy and better identification of sources of piracy (both from endpoint devices and within network/distribution flows). For instance, the notification of accessing of watermarked media content may indicate that that there are a number of copies of a same media content in distribution, but that one particular copy is being the most heavily consumed. Thus, it may be concluded that a particular copy is the primary source of piracy and can be traced back to a particular device, a particular distribution chain or a particular geographic origin, and so forth. In one example, the network service provider may present challenges for a user to access media content in an unauthorized way. For example, if a media content does not contain watermarks, or if the watermark(s) indicates that the accessing device and/or user is not authorized, the network service provider can cause a notification to be placed across the displayed media content indicating that it is detected that the user did not pay for the media content, or the device and/or user is not authorized to view the video. In addition, it can be made unprofitable for a piracy site to operate because a user can be detected to be accessing media content (regardless of how it comes to the user) and charged for it. If the user is charged all the same whether it comes from an authorized CDN or a piracy site, the piracy site does not offer a lesser cost to the user, while carrying the deterrent of being an unauthorized source.

In addition, logging of usage locations of watermarks and associated user metadata provides a revenue stream to content creators because billing could be derived from usage metrics. For example, alternative billing methodologies may be associated with the same media content depending upon whether the media content is actually consumed or remains unused, the time or place of playback, the type of playback platform, whether the media content is played on a different device than the device that downloaded the media content, and so forth. In one example, multiple endpoint devices may be registered to an account (e.g., a family account), and permitted to access the same media content. For instance, sharing may be allowed on up to five devices and so on.

In one example, a user may be watching a video program at a neighbor's house. The user may request and download the video program from the network using his or her family account, but may then play the video program on the neighbor's television. In one example, the downloading to the neighbor's device(s) may be detected and the network service provider may offer to the user and/or the neighbor to incur an additional charge for increasing the scope of authorized use to include the one time use. The network service provider may then allow or deny the playback of the video program according to the selection. In one example, the user may be allowed to stop an action that is a violation (e.g., someone attempting to use the user's account without knowledge of the user). Alternatively, or in addition, the user may be offered to switch access rights to the video program, e.g., forfeit the user's access rights and transfer to the neighbor. In still other examples, a message may be sent to the user to confirm that the neighbor did not steal the user's device, the neighbor may be invited to obtain a separate subscription or license, and so forth.

The specific actions of the network service provider may depend upon whether the endpoint device is able to check for watermarks and to report the watermarks to the network service provider, or whether the network service provider is relying upon network edge devices to check for watermarks in media content transiting the network for intended endpoint devices. In one example, watermarks may also be used to track accessing of specific portions of the media content. For instance, for a streaming video program, a network edge device may access watermarks from the first 30 minutes of the video program and report the accessing of the watermarks to the centralized processing system. However, the user may cease watching the video program. The network edge device may therefore not report further watermarks from the remainder of the video program. The centralized system may detect that only half of the video program is watched and could record a partial charge instead of a full charge for the entire video program. For instance, the network service provider may adjust the price based upon how much a particular media content is being consumed, e.g., over multiple copies, for a single copy, for family copies derived from a particular source copy (e.g., traceable via a blockchain-based watermark), and so forth. These and other aspects of the present disclosure are described in greater detail below in connection with the examples of FIGS. 1-3.

To better understand the present disclosure, FIG. 1 illustrates an example network 100, related to the present disclosure. As shown in FIG. 1, the network 100 connects mobile devices 157A, 157B, 167A and 167B, home network devices such as home gateway 161, set-top boxes (STBs) 162A and 162B, television (TV) 163A and TV 163B, home phone 164, router 165, and personal computer (PC) 166, other devices, such as device 191, and so forth, with one another and with various other devices via a core network 110, a wireless access network 150 (e.g., a cellular network), an access network 120, an access network 125, other networks 140, content distribution network (CDN) 170, and/or the Internet in general. For instance, connections between core network 110, access network 120, access network 125, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, access network 125, content distribution network (CDN) 170, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s), as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

In one example, home network 160 may receive television services via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like.

In one example, application servers 114 may include a content management server configured to receive and store watermarks regarding various media content, to verify authorization of various devices to access media content, to take actions in response to such verifications, and so forth. For instance, at least one of application servers 114 may comprise all or a portion of a computing device or system, such as computing system 300, and/or processing system 302 as described in connection with FIG. 3 below, specifically configured to perform various steps, functions, and/or operations for tracking an accessing of a media content via a watermark embedded by a network node, as described herein. It should be noted that the foregoing are only several examples of the types of relevant application servers 114 that may be included in core network 110 for storing information relevant to providing various services to subscribers.

Figure 3:
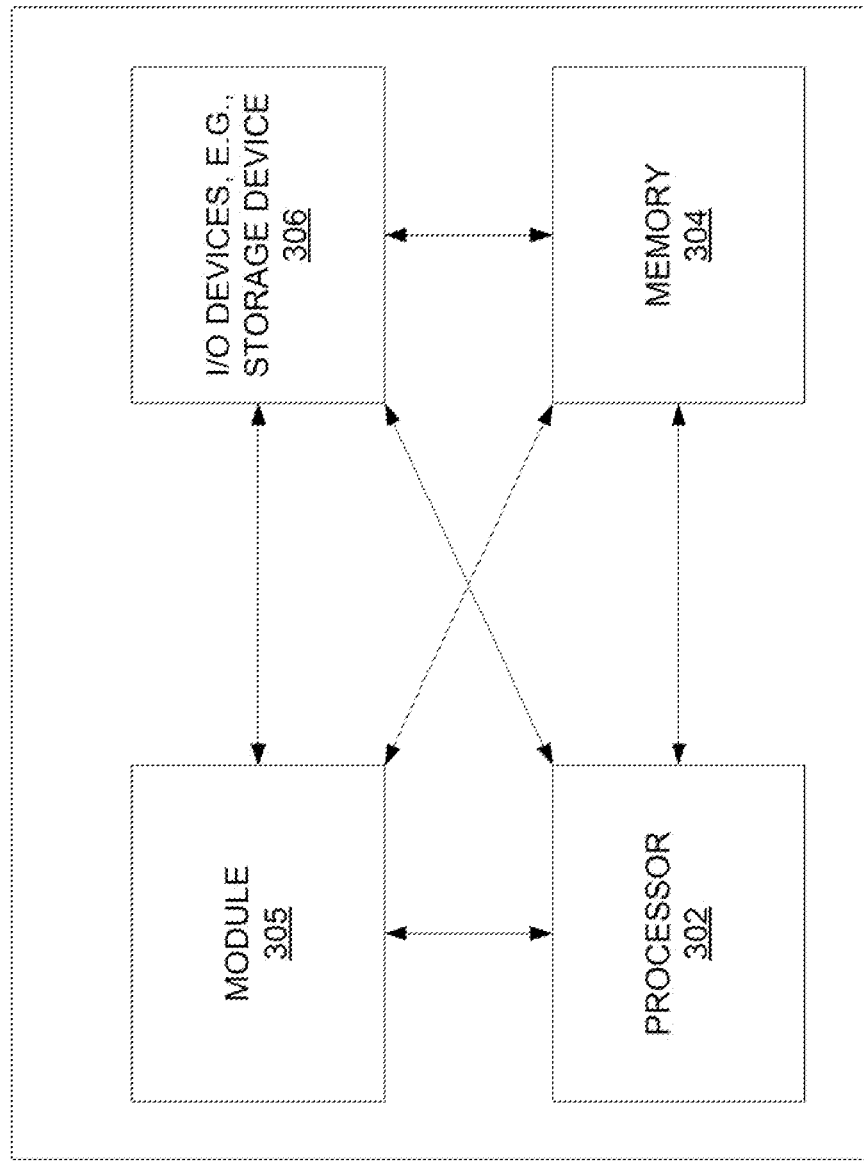
FIG. 3 illustrates a high level block diagram of a computing device specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, one or both of the STB/DVR 162A and STB/DVR 162B may comprise all or a portion of a computing device or system, such as computing system 300, and/or processing system 302 as described in connection with FIG. 3 below, specifically configured to perform various steps, functions, and/or operations in connection with tracking an accessing of a media content via a watermark embedded by a network node, as described herein. Among other functions, STB/DVR 162A and STB/DVR 162B may comprise video players capable of playing video programs in formats such as Moving Picture Expert Group (MPEG) .mpeg files, .mov files, .mp4 files, .3 gp files, .f4f files, .m3u8 files, or the like. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices. It should be noted that other devices, such as one or more of mobile devices 157A, 157B, 167A and 167B, and/or PC 166 may also comprise video players and/or audio players capable of playing video and/or audio programs in various formats.

In accordance with the present disclosure, other networks 140 and servers 149 may comprise networks and devices of various content providers, e.g., of video and/or audio programming, images, documents, and so forth. In addition, in one example, access network 125 may be the same as or similar to access network 120, e.g., a Digital Subscriber Line (DSL) network, a broadband cable access network, a Local Area Network (LAN), a cellular or wireless access network, a $3^{rd}$ party network, and the like. For instance, access network 125 may transmit and receive communications between device 191 and core network 110 relating to voice telephone calls, communications with web servers via other networks 140, content distribution network (CDN) 170 and/or the Internet in general, and so forth. Device 191 may represent a smart TV, a set-top-box (STB) and/or a digital video recorder (DVR), a PC, a laptop computer, a mobile device such as a smartphone or a computing tablet, and so forth. In various examples, access network 125 may be operated by a same or a different entity from core network 110, e.g., an Internet service provider (ISP) network. In addition, access network 125 may be operated by a same or a different entity from access network 120.

Network 100 may also include a content distribution network (CDN) 170. In one example, CDN 170 may be operated by a different entity from core network 110. In another example, CDN 170 may be operated by a same entity as core network 110, e.g., a telecommunication service provider. In one example, the CDN 170 may comprise a collection of cache servers distributed across a large geographical area and organized in a tier structure. The first tier may comprise a group of servers that access content web servers (origin servers) to pull content into the CDN 170, referred to as an ingestion servers, e.g., ingest server 172. The content may include video programs, audio programs, content of various webpages, electronic documents, video games, etc. A last tier may comprise cache servers which deliver content to end user, referred to as edge caches, or edge servers, e.g., edge server 174. For ease of illustration, a single ingest server 172 and two edge servers 174 and 175 are shown in FIG. 1. In between the ingest server 172 and edge servers 174 and 175, there may be several layers of servers (omitted from the illustrations), referred to as the middle tier. In one example, either or both of the edge servers 174 and 175 may be multi-tenant, serving multiple content providers, such as core network 110, content providers associated with server(s) 149 in other network(s) 140, and so forth. In addition, in one example, edge server 174 and/or edge sever 175 may comprise all or a portion of a computing device or system, such as computing system 300, and/or processing system 302 as described in connection with FIG. 3 below, specifically configured to perform various steps, functions, and/or operations for tracking an accessing of a media content via a watermark embedded by a network node, in accordance with the present disclosure.

In accordance with the present disclosure various devices may be involved in the distribution and tracking of access to various media content. For instance, other networks 140 and servers 149 may comprise networks and devices of various content providers, e.g., of video and/or audio programming, images, documents, and so forth. In one example, media content, e.g., video content, from servers 149 may be provided to TV servers 112 in core network 110, e.g., for television broadcast, VoD streaming, IPTV streaming, cellular streaming or cellular download, and so forth. For example, as discussed above, television servers 112 may include content server(s) to store scheduled television broadcast content for a number of television channels, video-on-demand (VoD) programming, local programming content, and so forth. In addition, television servers 112 may include a broadcast server, a cable head-end, and so forth which may broadcast or otherwise transmit the media content, e.g., via access network 120, access network 125, and/or CDN 170, via satellite broadcast by satellite 135, and so forth. Alternatively, or in addition, media content may be obtained by end users without the involvement of core network 110. For instance, servers 149 may comprise web servers/media caches that provide media contents to CDN 170 via ingest server 172. In turn, the media contents may be distributed to various end users, such as device 191 via access network 125, PC 166 via access network 120, home gateway 161, etc.

In accordance with the present disclosure, various devices illustrated in FIG. 1 may embed watermarks in media contents, may report the watermarking of media contents, may read watermarks from media contents, may modify watermarks in media contents, may report the accessing of media contents containing various watermarks, and so forth. As just one example, a user may order a video program from core network 110 via STB/DVR 162A. The video program may be watermarked by one of the TV servers 112, and the watermarking may be reported to a content management server, e.g., one of the application servers 114. In one example, the video program may also be watermarked by NE 111A on-route to the STB/DVR 162A via the access network 120, and the watermarking reported to the content management server. In one example, the STB/DVR 162A may play the video program on TV 163A. In addition, STB/DVR 162A may read the watermarks embedded in the video program and report the accessing of the media content to the content management server. In particular, STB/DVR 162A may report the watermarks as they are encountered in the video program. At a later time later, the content management server may receive a notification of the accessing of a same copy of the video program by device 191. For instance, device 191 may report the watermarks contained in the video program as they are encountered. Alternatively, or in addition, NE 111C and/or edge server 175 may report the accessing of the video program by device 191.

To illustrate, device 191 may request the video program from one of the servers 149 (e.g., a web server), and the video program may be streamed via core network 110 and/or CDN 170, and access network 125. The last-hop devices may inspect the video program, extract the watermarks, and report to the content management server that the video program containing the watermarks is being sent to the device 191. With this information, the content management server may determine that device 191 is accessing the same copy of the video program as previously sent to STB/DVR 162A. In addition, the content management server may determine that device 191 is not authorized to access this copy of the video program, and that the source of the video program (e.g., one of servers 149) may be hosting a pirated copy of the video program. Moreover, the content management server may determine that the pirated copy of the video program is in fact the copy that was originally sent to STB/DVR 162A. Thus, STB/DVR 162A may be considered as an initial source of the pirated copy.

For instance, one possibility is that a user associated with STB/DVR 162A may have copied the video program and uploaded the copy to the one of the servers 149. Alternatively, another entity may have accessed and copied the video program from STB/DVR 162A. Still another possibility is that a user associated with STB/DVR 162A may have permissibly copied the video program, e.g., downloaded to PC 166, mobile device 167A, etc. from which the copy of the video program may have later been stolen. For instance, the user may have lost mobile device 167A and someone finding the device 167A may have gained access to the video program and uploaded a copy to one of the servers 149.

In all of these scenarios, it is still valuable to be able to identify the version of the video program sent from one of the TV servers 112 to STB/DVR 162A as the source of the unlicensed copy that appears to have been made available from the one of the servers 149 and accessed by device 191. In addition, an account associated with device 191 may be appropriately charged for viewing the video program by the content management server and/or core network 110, e.g., where device 191 is also a device of a subscriber. In this way, the user may be appropriately charged for the viewing of the video program and the fees may be shared with the content owner, creator, and/or distributor, regardless of whether the content is obtained from an officially licensed source (e.g., core network 110 via TV servers 112), or an unlicensed source (e.g., one of the servers 149).

It should be noted that in some cases, an intended endpoint device of a media content may self-report the accessing of the media content. However, in cases where the intended endpoint device cannot or does not report the accessing of the media content, the reporting by the last-hop network devices may be used to track the accessing of the media contents by the respective endpoint devices with sufficient accuracy. In particular, the last-hop network devices may access the watermarks in the media content and report that a media content containing the watermarks is being sent to a particular endpoint device. The content management server may compare the watermarks in the media content to watermarks stored in a database and determine whether the intended endpoint device is an authorized recipient, whether the copy of the media content is authorized for distribution via the path taken through the reporting last-hop network element, and so forth.

In another example, an endpoint device and/or a last-hop network element may report to the content management server the accessing of a media content that is not watermarked. In such case, the content management server may determine that the copy of the media content is not legitimate and may further report the source of the media content for additional investigation. The content management server may also record the accessing of the media content by the endpoint device to make appropriate charges to an account associated with the endpoint device and to give an appropriate credit to the media content owner, creator, and/or distributor.

In one example, a plurality of devices in the network 100 may comprise a blockchain network. In one example, network-based devices that are involved in watermarking media content may also comprise blockchain nodes. Blockchain nodes may also comprise devices that are not involved in watermarking media content, not involved in reading and reporting watermarks from media content, and so forth. For instance, some or all of the blockchain nodes may comprise standalone devices (e.g., dedicated to creating blockchain records, or "mining"). The blockchain nodes may maintain blockchain ledgers recording blockchain records. In accordance with the present disclosure, the blockchain records may include blockchain transactions for tracking and verifying distribution and consumption of various media contents. For instance, a network node adding a watermark to a media content may submit the information of the watermark to the blockchain network as a blockchain transaction. The blockchain transaction (e.g., the watermark) may indicate that the media content has been received by the first network node from one or more other network-based devices and is being sent to one or more intended endpoint devices. Devices in the blockchain network may then include the watermark in a next blockchain record, in one of the next several blockchain records to be created, etc. The device generating the blockchain record may then provide the blockchain record to other devices in the blockchain network for recordation in respective blockchain ledgers. In accordance with the present disclosure, the blockchain network may include the content management server, e.g., one of application servers 114 that receives watermarks, compares watermarks to watermarks stored in a database, detects whether authorized or unauthorized devices are accessing media content, identifies certain copies of media content and pirated copies, and so forth. In particular, the watermarks in the database records of the content management server may be stored in the blockchain ledger, or may be stored in a different format, but verified via the blockchain records of the blockchain ledger.

In one example, the blockchain network may comprise a global public blockchain network. Thus, for example, blockchain nodes may include servers 149 in other networks, application servers 114 in core network 110, NEs 111A-111D, and/or edge servers 174 and 175, and so forth. In another example, the blockchain network may be a private blockchain network maintained by a particular network service provider (e.g., a network service provider operating core network 110 and/or CDN 170), and/or the network service provider with one or more trusted partners (such as content creators, owners, distributors, licensors, etc.).

Further details regarding the functions that may be implemented by edge servers 174 and 175, ingest server 172, NEs 111-111D, TV servers 112, application servers 114, servers 149, STBs/DVRs 162A and 162B, mobile devices 157A, 157B, 167A and 167B, and/or PC 166, device 191, and so forth are discussed in greater detail below in connection with the example of FIG. 2. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
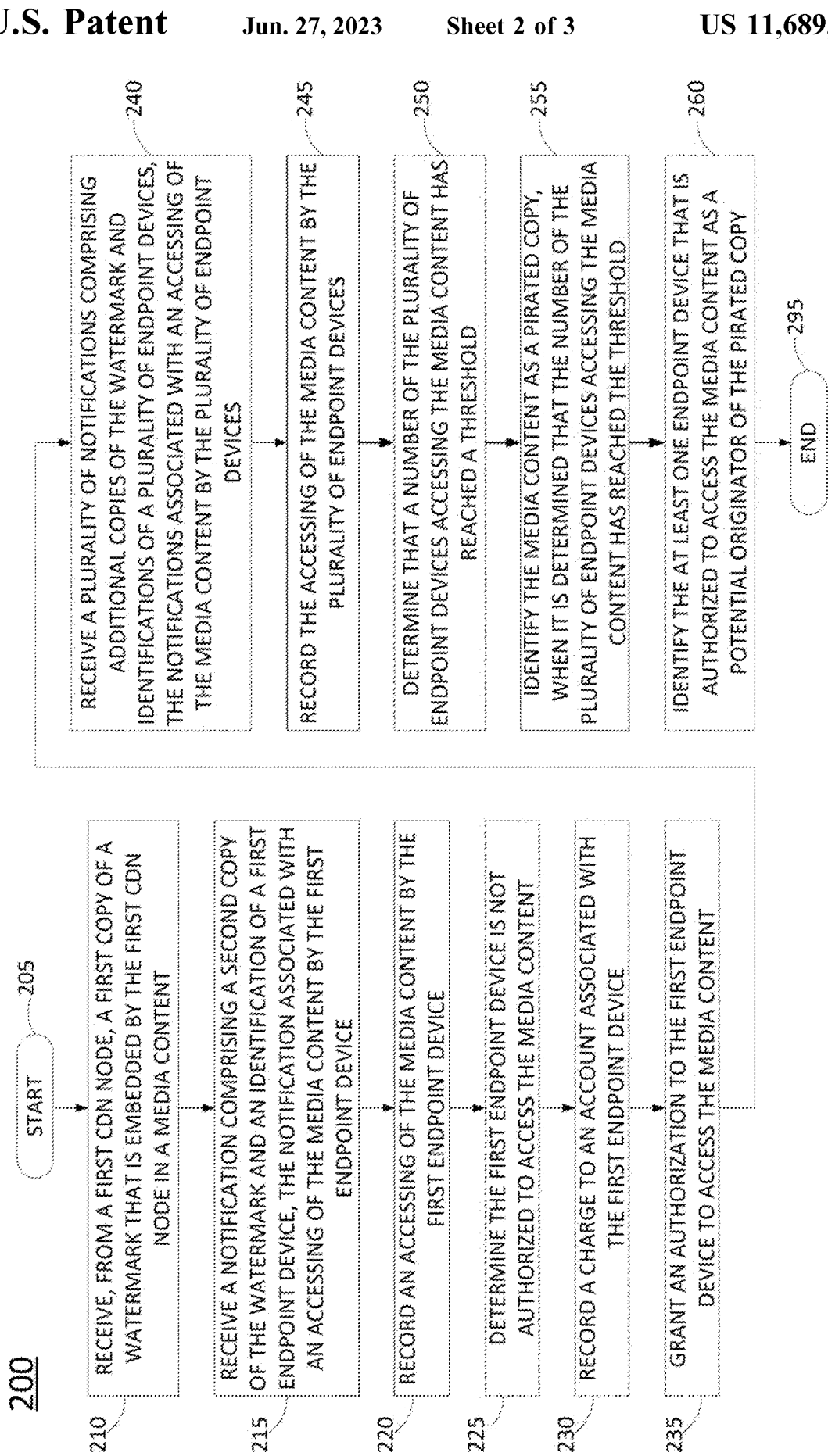
FIG. 2 a flowchart of an example method for tracking an accessing of a media content via a watermark embedded by a network node.

FIG. 2 illustrates a flowchart of a method 200 for tracking an accessing of a media content via a watermark embedded by a network node, in accordance with the present disclosure. In one example, the method 200 is performed by a network-based device, such as one of the application servers 114, or any one more components thereof, such as a processing system, or by one of these devices in conjunction with other devices and/or components of network 100 of FIG. 1, e.g., other application servers 114, NEs 111A-111D, edge servers 174 and 175, and so forth. In one example, the steps, functions, or operations of method 200 may be performed by a computing device or system 300, and/or a processing system 302 as described in connection with FIG. 3 below. For instance, the computing device 300 may represent any one or more components of a content management server and/or one or more other devices that is/are configured to perform the steps, functions and/or operations of the method 200. For illustrative purposes, the method 200 is described in greater detail below in connection with an example performed by a processing system, such as processing system 202. The method 200 begins in step 205 and proceeds to step 210.

At step 210, the processing system receives, from a first network node, a first copy of a watermark. In particular, in accordance with the present disclosure the watermark is embedded by the first network node in a media content and is reported to the processing system. The first network node may comprise, for example, an edge server, or last-hop network-based device, such as a CDN edge server, in a distribution path of the media content. However, it should be noted that not all network devices may be configured to add and/or read watermarks in media content. Accordingly, the first network node may be a last device in a distribution chain of the media content that is configured to read and/or write watermarks in accordance with the present disclosure. In one example, the watermark identifies the network node. In one example, the watermark further identifies at least one endpoint device that is authorized to access the media content. The watermark may further include information such as where the media content came from, where the media content is going, when it was transferred, a permitted account, a permitted number of replays, a duration of rental, a geographic restriction, and so forth.

In one example, the watermark is encoded in the media content by the first network node before sending the media content to at least one intended endpoint device. In addition, in one example, the first copy of the watermark may be recorded in a blockchain record before and/or after being received by the processing system. For instance, the first network node may submit the information of the watermark to a blockchain network as a blockchain transaction. The blockchain transaction (e.g., the watermark) may indicate that the media content has been received by the first network node from one or more other network-based devices and is being sent to one or more intended endpoint devices. Devices in the blockchain network may then include the watermark in a next blockchain record, in one of the next several blockchain records to be created, etc. The device generating the blockchain record may then provide the blockchain record to other devices in the blockchain network for recordation in respective blockchain ledgers, where the blockchain network includes the processing system. In other words, the processing system may store a copy of the watermark as a blockchain record.

In one example, the processing system may have previously encoded, e.g., embedded, another watermark to the media content. In another example, the watermark encoded in the media content by the first network node may comprise a modified and/or updated version of a watermark that has previously been encoded into the media content by the processing system and/or another network-based device. To illustrate, the processing system may store one or more database records for the media content which may store information regarding at least one endpoint device that is authorized to access the media content, where the media content came from, where the media content is going, when it was transferred, a permitted account, a permitted number of replays, a duration of rental, a geographic restriction, and so forth. In one example, the stored information may also be stored in a blockchain record by the processing system and/or a number of additional devices in a blockchain network. For instance, the processing system may have submitted information relating to the sending of the media content in a different blockchain transaction. In one example, the processing system may also store database records regarding user accounts, various endpoint devices associated with the user accounts, media contents that are permitted to be accessed in connection with the user accounts, and so forth. In one example, the first copy of the watermark received from the first network node may be compared against this stored information to determine that the media content is on a permitted and/or an intended distribution path, is being sent to a permitted destination, and so forth.

At step 215, the processing system receives a notification comprising a second copy of the watermark and an identification of a first endpoint device. In particular, the notification is associated with an accessing of the media content by the first endpoint device. For instance, the first endpoint device may be accessing the media content (e.g., playing a video or audio program via a display screen and/or a speaker), and may read the watermark that is encoded therein and report the watermark (e.g., the "second copy" of the watermark) to the processing system. Alternatively, or in addition, another device in a local network associated with the endpoint device, and/or a network edge server may detect that the media content is passing through such device to the first endpoint device, may read the watermark encoded therein, and may report the watermark (e.g., the "second copy" of the watermark) to the processing system along with the identification of the first endpoint device. The reporting may also indicate an identity of the network edge server or other reporting devices, a location, a time of the media content and/or the watermark being detected at such a device, and so forth.

In one example, the first endpoint device or another device that is reporting the second copy of the watermark may also update the watermark in the media content or add one or more additional watermarks to the media content. For instance, a watermark may also be used to track how many times a video program has been watched and on which device(s). Thus, the watermark may indicate that a particular copy of the video program has been watched on the first endpoint device. However, the watermark may also record that the copy of the video program has previously been watched on another endpoint device. In one example, the notification comprising a second copy of the watermark and an identification of a first endpoint device may be in the form of a blockchain transaction that is submitted to a blockchain network for recordation in a blockchain record.

At step 220, the processing system records an accessing of the media content by the first endpoint device. For instance, if the notification of the accessing of the media content by the first endpoint device comprises a blockchain record, step 220 may comprise the processing system recording the blockchain record in a blockchain ledger maintained by the processing system. In one example, watermark updates (or additional watermark(s)) related to multiple accesses of the same copy of the media content may be further recorded in one or more blockchain records. In particular, the processing system may verify the number of times that a particular copy of a media content has been accessed.

At step 225, the processing system may optionally determine the first endpoint device is not authorized to access the media content. For example, the processing system may utilize a blockchain ledger to verify various transactions relating to a media content and/or particular copies of a media content. As discussed above, the processing system may also maintain database records relating to the media content and/or an account associated with the first endpoint device. Thus, the blockchain record may be used to verify the contents of the database record(s). In such an example, the processing system may access the database record(s) to compare the notification, which identifies a particular copy of the media content and the first endpoint device, to stored information regarding the authorization (or lack thereof) of the first endpoint device to access the media content.

In one example, the first endpoint device may not be authorized to access the media content when the first endpoint device was not an intended endpoint device (i.e., an intended recipient) of a particular copy of the media content. For instance, the first copy of the watermark may indicate that the media content was being sent from the first network device to a second endpoint device. However, the media content may have been copied from the second endpoint device to the first endpoint device, may have been uploaded by the second endpoint device to a media sharing website from which the media content is downloaded by the first endpoint device, and so forth. In any number of different ways, the first endpoint device may have come to access the first media content without prior authorization. Nevertheless, the tracking of the second copy of the watermark and the comparing to the first copy of the watermark may detect that the first endpoint device is not authorized to access that particular copy of the media content.

At step 230, the processing system may optionally record a charge to an account associated with the first endpoint device. For instance, at step 225 the processing system may determine that the first endpoint device is not authorized to access the media content, or is permitted to access the media content, but has not yet paid for that access. Thus, the processing system may automatically record the charge to the account associated with the first endpoint device.

At step 235, the processing system may optionally grant an authorization to the first endpoint device to access the media content. In particular, the processing system may automatically charge the account associated with the first endpoint device at step 230 and then allow the access at step 235. In one example, any database records relating to the media content and/or the account associated with the first endpoint device may be updated to indicate that the first endpoint device (and in one example, other endpoint devices associated with the account) may now access the media content.

At step 240, the processing system may optionally receive a plurality of notifications comprising additional copies of the watermark and identifications of a plurality of endpoint devices, wherein the notifications are associated with an accessing of the media content by the plurality of endpoint devices. For instance, step 240 may comprise the same or similar operations as described above in connection with step 215 (e.g., with respect to each of a plurality of different accesses to the media content by the plurality of different endpoint devices). In one example, the notifications may comprise blockchain transactions recorded in one or more blockchain records. The plurality of notifications may be received from the respective endpoint devices, from network edge servers forwarding the media content to respective endpoint devices, and/or from one or more devices in a blockchain network that create blockchain records.

At step 245, the processing system records the accessing of the media content by the plurality of endpoint devices. For instance, step 245 may comprise the same or similar operations as described above in connection with step 220 (e.g., with respect to each of a plurality of different accesses to the media content by the plurality of different endpoint devices). In one example, the recording may include entering received blockchain records in a blockchain ledger. In one example, the processing system may also create or update database records relating to the media content and/or accounts associated with the respective endpoint devices.

At step 250, the processing system may optionally determine that a number of the plurality of endpoint devices accessing the media content has reached a threshold. For instance, the processing system may track a number of accesses of a same copy of a media content for possible piracy, e.g., non-permitted file sharing. The threshold may comprise 10 accesses, 20 accesses, 50 accesses, etc.

At step 255, the processing system identifies the media content as a pirated copy, when it is determined that the number of the plurality of endpoint devices accessing the media content has reached the threshold. For instance, when a number of accesses of the particular version of the media content exceeds 10 accesses, 20 accesses, 50 accesses, etc., the particular version of the media content may be identified as a potential piracy source.

At step 260, the processing system mayo optionally identify the at least one endpoint device that is authorized to access the media content as a potential originator of the pirated copy. In particular, the first copy of the watermark (as well as the additional copies of the watermark) and one or more database records may indicate that a second endpoint device was an intended recipient of the media content. However, the plurality of other endpoint devices may all be accessing the same copy of the media content. Thus, the second endpoint device may be identified as a potential piracy source, either by virtue of the user of the second endpoint device having uploaded the media content to a file sharing server, by the second endpoint device having been stolen or hacked, and so forth.

Following step 260, the method 200 proceeds to step 295 where the method ends.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the system 300. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for tracking an accessing of a media content via a watermark embedded by a network node, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 306 may also include antenna elements, transceivers, power units, and so forth. Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for tracking an accessing of a media content via a watermark embedded by a network node (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for tracking an accessing of a media content via a watermark embedded by a network node (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, by a processing system including at least one processor, from a first network node, a first copy of a watermark, wherein the watermark is embedded by the first network node in a media content;
   receiving, by the processing system, a notification comprising a second copy of the watermark and an identification of a first endpoint device, wherein the notification is associated with an accessing of the media content by the first endpoint device, wherein the watermark is one of a plurality of watermarks in the notification, wherein each of the plurality of watermarks is embedded in the media content by one of: a distributor of the media content or one of a plurality of network nodes in a distribution pipeline of the media content, wherein the plurality of network nodes includes the first network node, and wherein each respective watermark of the plurality of watermarks identifies one of: the distributor of the media content or the one of the plurality of network nodes in the distribution pipeline of the media content that inserted the each respective watermark;
   determining, by the processing system, in response to receiving the notification, that the first endpoint device has not been charged to access the media content;
   recording, by the processing system, a charge to an account associated with the first endpoint device; and
   recording, by the processing system, the accessing of the media content by the first endpoint device, wherein the recording records that the media content that is accessed by the first endpoint device was distributed via the distribution pipeline of the media content.

2. The method of claim 1, wherein the watermark identifies the first network node.

3. The method of claim 1, wherein the watermark further identifies at least one endpoint device that is authorized to access the media content.

4. The method of claim 1, wherein the watermark is embedded in an encoding of the media content.

5. The method of claim 1, wherein each of the plurality of watermarks is associated with a permission to access the media content.

6. The method of claim 1, wherein the notification further includes a time stamp.

7. The method of claim 1, further comprising:
   receiving a plurality of notifications comprising additional copies of the watermark and identifications of a plurality of endpoint devices, wherein the plurality of notifications is associated with an accessing of the media content by the plurality of endpoint devices; and
   recording the accessing of the media content by the plurality of endpoint devices.

8. The method of claim 7, wherein the watermark further identifies at least one endpoint device that is authorized to access the media content.

9. The method of claim 8, further comprising:
   determining that a number of the plurality of endpoint devices accessing the media content has reached a threshold;
   identifying the media content as a pirated copy, when it is determined that the number of the plurality of endpoint devices accessing the media content has reached the threshold; and
   identifying the at least one endpoint device that is authorized to access the media content as a potential originator of the pirated copy.

10. The method of claim 1, wherein the watermark is shared as a blockchain record with a plurality of devices in a blockchain network, wherein the blockchain network includes the processing system and the first network node.

11. The method of claim 10, wherein the watermark is written to a blockchain block via the blockchain network, wherein the blockchain block is stored by the plurality of devices in the blockchain network in a plurality of blockchain ledgers.

12. The method of claim 10, wherein the notification comprising the second copy of the watermark and the identification of the first endpoint device is received as a blockchain record from at least one of:
   the first endpoint device;
   the first network node; or
   a second network node.

13. The method of claim 12, wherein the blockchain network further includes the first endpoint device.

14. A non-transitory computer-readable medium storing instructions which, when executed by a processing system including at least one processor, cause the processing system to perform operations, the operations comprising:
   receiving, from a first network node, a first copy of a watermark, wherein the watermark is embedded by the first network node in a media content;
   receiving a notification comprising a second copy of the watermark and an identification of a first endpoint device, wherein the notification is associated with an accessing of the media content by the first endpoint device, wherein the watermark is one of a plurality of watermarks in the notification, wherein each of the plurality of watermarks is embedded in the media content by one of: a distributor of the media content or one of a plurality of network nodes in a distribution pipeline of the media content, wherein the plurality of network nodes includes the first network node, and wherein each respective watermark of the plurality of watermarks identifies one of: the distributor of the media content or the one of the plurality of network nodes in the distribution pipeline of the media content that inserted the each respective watermark;

determining, in response to receiving the notification, that the first endpoint device has not been charged to access the media content;

recording a charge to an account associated with the first endpoint device; and recording the accessing of the media content by the first endpoint device, wherein the recording records that the media content that is accessed by the first endpoint device was distributed via the distribution pipeline of the media content.

15. A device comprising:

a processing system including at least one hardware processor; and a computer-readable medium storing instructions which, when executed by the processing system, cause the processing system to perform operations, the operations comprising:

receiving, from a first network node, a first copy of a watermark, wherein the watermark is embedded by the first network node in a media content;

receiving a notification comprising a second copy of the watermark and an identification of a first endpoint device, wherein the notification is associated with an accessing of the media content by the first endpoint device, wherein the watermark is one of a plurality of watermarks in the notification, wherein each of the plurality of watermarks is embedded in the media content by one of: a distributor of the media content or one of a plurality of network nodes in a distribution pipeline of the media content, wherein the plurality of network nodes includes the first network node, and wherein each respective watermark of the plurality of watermarks identifies one of: the distributor of the media content or the one of the plurality of network nodes in the distribution pipeline of the media content that inserted the each respective watermark;

determining, in response to receiving the notification, that the first endpoint device has not been charged to access the media content;

recording a charge to an account associated with the first endpoint device; and recording the accessing of the media content by the first endpoint device, wherein the recording records that the media content that is accessed by the first endpoint device was distributed via the distribution pipeline of the media content.

16. The device of claim 15, wherein the watermark identifies the first network node.

17. The device of claim 15, wherein the watermark further identifies at least one endpoint device that is authorized to access the media content.

18. The device of claim 15, wherein the watermark is embedded in an encoding of the media content.

19. The device of claim 15, wherein each of the plurality of watermarks is associated with a permission to access the media content.

20. The device of claim 15, wherein the notification further includes a time stamp.

* * * * *